Patented Dec. 22, 1953

2,663,721

UNITED STATES PATENT OFFICE 2,663,721

PREPARATION OF O,O-DIALKYL O-PARA NITROPHENYL THIOPHOSPHATE ESTERS

Michael N. Dvornikoff, St. Louis, and Evan J. Young, Valley Park, Mo., assignors to Monsanto Chemical Company, St. Louis, Mo., a corporation of Delaware No Drawing. Application May 16, 1949,
Serial No. 93,634

12 Claims. (Cl. 260—461)

1

This invention relates to organic thiophosphate esters; more particularly it relates to an improved commercially feasible process for the preparation of O,O-dialkyl O-p-nitrophenyl thiophosphate esters of the general formula:

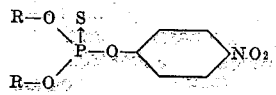

wherein R represents an alkyl chain containing at least 1 and not more than 8 carbon atoms. Hereinafter, the generic term organic thiophosphate esters is limited to include only those esters represented by the aforementioned general formula.

Organic thiophosphate esters, in particular the O,O-diethyl O-p-nitrophenyl thiophosphate, are of considerable interest as insecticides. Heretofore, such esters were prepared by reacting 2 mols of the proper sodium alkylate with 1 mol of thiophosphoryl chloride thereby forming the dialkoxythiophosphoryl chloride. This reaction product was then added to a mol of anhydrous sodium p-nitrophenate suspended in monochlorobenzene. This particular process results in low yields and is extremely hazardous. In order to prepare the suspension of sodium p-nitrophenate in monochlorobenzene, it is necessary to add p-nitrophenol to monochlorobenzene, neutralize with a solution of sodium hydroxide and subsequently dehydrate by an azeotropic distillation of the monochlorobenzene and water. During distillation there is a tendency for the sodium p-nitrophenate to lump and be subjected to local overheating. This local overheating at times causes the sodium p-nitrophenate to decompose violently thereby making commercial preparation of this suspension hazardous and undesirable.

It is an object of this invention to provide a process for the preparation of organic thiophosphate esters.

It is a further object of this invention to provide an improved commercially feasible process for the preparation of organic thiophosphate esters wherein the hazard connected with the use of an alkali metal p-nitrophenate is reduced to a minimum.

It is also an object of this invention to provide an improved commercially feasible process for the preparation of organic thiophosphate esters in which process these esters are obtained in high yields.

Further objects will become apparent from the description of the process and the claims.

The objects of this invention are accomplished by the applicants' novel process which comprises preparing the dialkoxythiophosphoryl chloride in the normal manner and reacting the dialkoxythiophosphoryl chloride with an alkali metal p-nitrophenate in an alcoholic medium. This reaction may be carried out in several ways. To the dialkoxythiophosphoryl chloride prepared in the normal manner may be added p-nitrophenol and subsequently an alcoholic solution of an alkali metal alkylate, thereby forming in situ an alkali metal p-nitrophenate which reacts on formation with the dialkoxythiophosphoryl chloride to form the organic thiophosphate ester in high yields. The reaction may also be carried out by reacting dialkoxythiophosphoryl chloride with an alkali metal p-nitrophenate contained in an alcoholic medium.

Example I

To 83.1 pounds of thiophosphoryl chloride was added, over a period of two to three hours, 350.5 pounds of an approximately 20% solution of sodium ethylate in ethyl alcohol, maintaining the temperature below 10° C. To this mixture was then added 68.2 pounds of p-nitrophenol, and to this resulting solution was added, over a period of one to two hours, 166.9 pounds of an approximately 20% solution of sodium ethylate in ethyl alcohol, maintaining the temperature below 10° C. This reaction mass was agitated by mechanical stirring for approximately 18 hours at the end of which time the reaction was complete.

A larger portion of the ethyl alcohol in the batch was distilled from the stirred batch at atmospheric pressure. To the reaction mixture was then added 47 gallons of water in order to dissolve sodium chloride and to separate the O,O-diethyl O-p-nitrophenyl thiophosphate from the residual alcohol. The resulting mixture was pumped through a pre-coated filter in order to remove gums. The filtrate was allowed to separate into an upper aqueous layer which was decanted from the lower layer of O,O-diethyl O-p-nitrophenyl thiophosphate.

The lower layer was twice washed by stirring with 15 gallons of a 3% aqueous solution of sodium carbonate which was followed by one 15 gallon water wash.

The wet lower layer was then subjected to a steam distillation to remove triethyl thiophosphate. The distillation was continued until no more oil was noticed in the distillate.

The water layer was decanted from the cooled material in the still pot. The organic layer was dried by heating to 110° C. under 100 mm. vacuum for ½ hour. The finished product, O,O-diethyl O-p-nitrophenyl thiophosphate, was obtained in an over all yield of 70% based on thiophosphoryl chloride.

The O,O-diethyl O-p-nitrophenyl thiophosphate thus obtained was a dark brown oily liquid, having a crystallizing point of 3.4° C., a specific gravity of 25°/25° of 1.2651 and a $n_D^{25}$ C. of 1.537.

While specific quantities and temperatures have been set forth in Example I, it is not intended that the scope of the novel process of this invention be limited solely to these expressed quantities and temperatures. Thus, for example, while 2.0 to 2.2 mols of sodium alkylate, the sodium salt of an alkyl alcohol containing at least 1 and not more than 8 carbon atoms, to 1 mol of thiophosphoryl chloride is illustrative of the preferred range of quantities of reactants for the formation of dialkoxythiophosphoryl chloride, greater or lesser amounts of sodium alkylate may be utilized. However, if greater than 2.2 mols of sodium alkylate are used excessive quantities of trialkyl thiophosphate are formed and if less than 2.0 mols of sodium alkylate are used excessive quantities of alkoxythiophosphoryl dichloride are formed.

The concentration of sodium ethylate in ethyl alcohol may also be considerably varied. However, if the concentration of sodium ethylate is increased significantly above 20%, sodium ethylate tends to crystallize from the alcohol solution. If the concentration is reduced below 20%, the reaction may still be carried out. However, provision must be made for the increased quantities of solution required.

The reactions are best carried out at a temperature in the range of from about −10° C. to about 10° C. Temperatures in excess of 10° C. promote the formation of trialkyl thiophosphate. If the temperature is reduced below −10° C., the reaction necessarily proceeds slower. However, in the reaction between dialkoxythiophosphoryl chloride and the alkali metal para-nitrophenate in an alcoholic medium, a temperature within the preferred range of from about −10° C. to about 10° C. need be maintained only during the time that the alkali metal p-nitrophenate in an alcoholic medium is being added to the dialkoxythiophosphoryl chloride. Subsequent to the addition of the reactants, the temperature may be raised even to the boiling point of the more volatile component.

The reactants, namely, thiophosphoryl chloride, alkyl alcohol solution of sodium alkylate and p-nitrophenol, should be substantially anhydrous with a moisture content of preferably less than 0.3% by weight. By maintaining substantially anhydrous conditions, it is possible to recover substantially anhydrous alcohol from the reaction, which may be recycled without further dehydration and used to prepare additional quantities of an alkyl alcohol solution of sodium alkylate. In order that commercially feasible yields be obtained, however, it is not absolutely necessary that substantially anhydrous conditions be maintained during the reaction between dialkoxythiophosphoryl chloride and the sodium p-nitrophenate in an alcoholic medium. Thus, in this last step of the reaction, it is possible to utilize an alcoholic medium that may contain as much as 20% by weight of water. Furthermore, in this latter step the alkali metal p-nitrophenate in an alcoholic medium could be prepared by reacting p-nitrophenol with sodium carbonate, potassium hydroxide, potassium carbonate, or sodium hydroxide in an alcoholic medium, thereby forming an aqueous alcoholic solution or suspension of an alkali metal p-nitrophenate. Utilizing such a method of preparation of the alcoholic solution of the alkali metal p-nitrophenate does not permit the recovery of substantially anhydrous alcohol from the reaction. In such a case, therefore, the recovered alcohol must be dehydrated before additional quantities of an anhydrous alkyl alcohol solution of sodium alkylate may be prepared and utilized in the preparation of dialkoxythiophosphoryl chloride, which reaction is best carried out under substantially anhydrous conditions according to the process as described herein.

While it is more economically feasible to utilize the same sodium alkylate solution in the corresponding alcohol in both the reaction for the formation of dialkoxythiophosphoryl chloride and the final reaction for the formation of dialkyl p-nitrophenyl thiophosphate, a different alcohol solution of a different sodium alkylate may be utilized in the latter reaction. Thus, in the formation of sodium p-nitrophenate in situ in Example I, a solution of sodium butylate in butyl alcohol could have been utilized. However, inasmuch as the alcohol recovered from the latter reaction is substantially anhydrous and may be recycled for the preparation of additional quantities of sodium alkylate, it is preferable to utilize the same alcohol and sodium alkylate in the latter reaction as was used in the first reaction.

The order of adding the reactants in the above mentioned step of the novel process of this invention is to a certain degree of significance. It is preferred that the reactants be added so as not to have present a mixture of dialkoxythiophosphoryl chloride and an alcohol solution of sodium alkylate without the added presence of p-nitrophenol in such a quantity that the molecular proportion of p-nitrophenol present approaches or exceeds the molecular proportion of sodium alkylate present in the mixture. Thus, while in Example I is illustrated the preferred procedure for carrying out this reaction, that is the formation of sodium p-nitrophenate in situ, it is not intended that the applicants' invention be solely limited to this procedure. It has been found that equally good yields and purity of product may be obtained by adding the p-nitrophenol and alcohol solution of sodium alkylate simultaneously to the dialkoxythiophosphoryl chloride. Furthermore, the alcoholic solution of sodium p-nitrophenate may be prepared separately by adding a 1 molecular proportion of p-nitrophenol to a substantially 1 molecular proportion of sodium alkylate in an alcohol solution and reacting the thus formed sodium p-nitrophenate contained in an alcoholic medium with dialkoxythiophosphoryl chloride either by adding the alcoholic solution of sodium p-nitrophenate to the dialkoxythiophosphoryl chloride or by adding dialkoxythiophosphoryl chloride to the alcoholic solution of sodium p-nitrophenate.

It is preferred that p-nitrophenol be used in the ratio of approximately a one molecular proportion of the amount of thiophosphoryl chloride initially utilized. However, the amount may be varied to some extent. If the amount of p-nitrophenol is substantially decreased, the desired reaction may not be completed. If the quantity of p-nitrophenol is substantially increased, excessive quantities of p-nitrophenol or sodium p-nitrophenate will remain unreacted.

It is also preferred that sodium alkylate be used in the ratio of approximately one molecular proportion to the amount of p-nitrophenol utilized. However, the amount may be varied to some extent. If the amount of sodium alkylate is substantially increased over the preferred proportion, excessive quantities of trialkyl thiophosphate are formed affecting the yield of the final product. If substantially lesser quantities are used, the yield of the final product will be decreased as all of the dialkoxythiophosphoryl chloride will not have reacted to form O,O-diethyl O-p-nitrophenyl thiophosphate.

Example II

To 1 mol of thiophosphoryl chloride in a suitable reactor was added over a period of two hours 2.05 mols of sodium methylate contained as a 20% solution in methyl alcohol, maintaining the temperature below 10° C. To this mixture was added 1 mol of p-nitrophenol and to the resulting solution was then added, over a period of 1 hour, 1 mol of sodium methylate contained in a 20% solution of methyl alcohol, maintaining the temperature below 10° C. Stirring was continued for 16 hours at which time the reaction was complete.

Approximately 80% of the excess methyl alcohol was distilled at atmospheric pressure from the stirred batch. The batch was then washed with water, filtered and decanted. The lower layer was twice washed with a 3% aqueous solution of sodium carbonate, followed by another water wash. The wet lower layer was subjected to steam distillation until no more oil was noticed being carried over in the distillate. The water layer was decanted from the organic material and the finished product, O,O-dimethyl O-p-nitrophenyl thiophosphate was dried by heating to 110° C. under 100 mm. vacuum for ½ hour.

Example III

To 1 mol of thiophosphoryl chloride contained in a suitable reactor was added 2.2 mols of sodium butylate contained as a 20% solution of sodium butylate in butanol. The temperature was maintained below 10° C. during the addition period which extended over a period of 3 hours. To this reaction mass was added one mol of anhydrous sodium p-nitrophenate contained as a 20% solution in butyl alcohol. During this addition period which extended over a period of 2 hours, the temperature was maintained below 10° C. The mixture was agitated for 16 hours at which time the reaction was complete.

Excess butanol was distilled from the batch at atmospheric pressure. The resulting reaction mass was further purified in accordance with the procedure outlined in Example II. The resultant product was O,O-dibutyl O-p-nitrophenyl thiophosphate.

Example IV

To 1 mol of thiophosphoryl chloride was added, over a period of 3 hours, 2.1 mols of sodium 2-ethylhexylate contained as a 10% solution of sodium 2-ethylhexylate in 2-ethylhexanol, maintaining the temperature below 10° C. To this mixture was added 1 mol of p-nitrophenol and subsequently, over a period of 2 hours, 1 mol of sodium 2-ethylhexylate contained as a 10% solution in 2-ethylhexanol. The mixture was agitated for 16 hours at which time the reaction was complete.

Excess 2-ethylhexanol was removed by distillation under reduced pressure. The reaction mass was then washed with water and a 3% aqueous solution of sodium carbonate. The wet product was subjected to steam distillation. The water layer was decanted from the cooled material and the organic layer dried by heating to 110° C. under 100 mm. vacuum for ½ hour. The resultant product was O,O-di-2-ethylhexyl O-p-nitrophenyl thiophosphate.

Example V

To 83.1 lbs. of thiophosphoryl chloride was added, over a period of 2 to 3 hours, 350.5 lbs. of an approximately 20% solution of sodium ethylate in ethyl alcohol, maintaining a temperature below 10° C. To this mixture was then added 68.2 lbs. of p-nitrophenol and 19.6 lbs. of flaked sodium hydroxide. The reaction mass was agitated until the reaction was complete.

A large portion of the ethyl alcohol in the batch was distilled from the batch at atmospheric pressure. Water was then added to the reaction mixture to dissolve sodium chloride and to separate the thiophosphate ester from the alcohol. After filtering to remove gums, the filtrate was allowed to separate into an upper aqueous layer which was decanted from the lower layer of O,O-diethyl O-p-nitrophenyl thiophosphate.

The lower layer was washed with a 3% aqueous solution of sodium carbonate and water. The wet lower layer was then subjected to steam distillation to remove triethyl thiophosphate. The wet ester was recovered and dried by heating at about 110° C. under vacuum, thereby obtaining substantially pure O,O-diethyl O-p-nitrophenyl thiophosphate in excellent yield.

Example VI

Over a period of several hours, 350 lbs. of an approximately 20% solution of sodium ethylate in ethyl alcohol was added to 83 lbs. of thiophosphoryl chloride while maintaining a temperature below about 10° C. To this mixture was then added 68 lbs. of p-nitrophenol and 52.0 lbs. of sodium carbonate while maintaining a temperature below about 10° C. After all the reactants had been added, the temperature was raised to about 80° C. and agitated by mechanical stirring until the reaction was complete.

Excess ethyl alcohol was removed by distillation under reduced pressure. The reaction mass was washed with water and a dilute solution of sodium carbonate. The wet product was then subjected to steam distillation to remove triethyl thiophosphate. The organic layer was then dried by heating to about 110° C. under vacuum, thereby obtaining in excellent yield O,O-diethyl O-p-nitrophenyl thiophosphate.

This application is a continuation in part of our copending application, Serial No. 40,014, filed July 21, 1948, now abandoned.

What is claimed is:

1. In a process for the preparation of O,O-dialkyl O-p-nitrophenyl thiophosphate esters represented by the formula

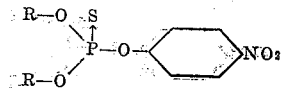

wherein R represents an alkyl radical containing at least 1 and not more than 8 carbon atoms, the step comprising maintaining reaction temperatures within the range of about −10° C. to +10° C. while adding together in an alkyl alcoholic medium substantially equimolecular proportions each of (1) dialkoxythiophosphoryl chloride wherein each alkyl substituent contains at least 1 and not more than 8 carbon atoms, (2) p-nitrophenol, and (3) sodium alkylate containing at least 1 and not more than 8 carbon atoms, said sodium alkylate being added as a solution of sodium alkylate in alkyl alcohol.

2. In a process for the preparation of O,O-dialkyl O-p-nitrophenyl thiophosphate esters represented by the formula

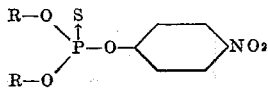

wherein R represents an alkyl radical containing at least 1 and not more than 8 carbon atoms, the step comprising maintaining reaction temperatures within the range of about −10° C. to +10° C. during the simultaneous addition of substantially equimolecular proportions each of p-nitrophenol and sodium alkylate to an alkyl alcoholic medium containing an equimolecular proportion of dialkoxythiophosphoryl chloride, wherein each alkyl substituent of said dialkoxythiophosphoryl chloride contains at least 1 and not more than 8 carbon atoms, and said sodium alkylate contains at least 1 and not more than 8 carbon atoms and being added as a solution of sodium alkylate in alkyl alcohol.

3. In a process for the preparation of O,O-dialkyl O-p-nitrophenyl thiophosphate esters represented by the formula

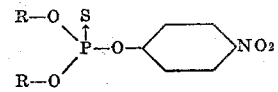

wherein R represents an alkyl radical containing at least 1 and not more than 8 carbon atoms, the step comprising maintaining reaction temperatures within the range of about −10° C. to +10° C. during the addition of a substantially equimolecular proportion of sodium alkylate to an alkyl alcoholic medium containing substantially equimolecular proportions each of p-nitrophenol and dialkoxythiophosphoryl chloride, wherein each alkyl substituent of said dialkoxythiophosphoryl chloride contains at least 1 and not more than 8 carbon atoms, and said sodium alkylate contains at least 1 and not more than 8 carbon atoms and is added as a solution of sodium alkylate in an alkyl alcohol.

4. In a process for the preparation of O,O-diethyl O-p-nitrophenyl thiophosphate, the step comprising maintaining reaction temperatures within the range of about −10° C. to +10° C. during the addition of a substantially equimolecular proportion of sodium alkylate to an alkyl alcoholic medium containing substantially equimolecular proportions each of p-nitrophenol and diethoxythiophosphoryl chloride, said sodium alkylate containing at least 1 and not more than 8 carbon atoms and being added as a solution of sodium alkylate in alkyl alcohol.

5. In a process for the preparation of O,O-diethyl O-p-nitrophenyl thiophosphate, the step comprising maintaining reaction temperatures within the range of about −10° C. to +10° C. during the addition of a substantially equimolecular proportion of sodium ethylate to an ethyl alcohol solution of substantially equimolecular proportion each of p-nitrophenol and diethoxythiophosphoryl chloride, said sodium ethylate being added as a solution of sodium ethylate in ethyl alcohol.

6. In a process for the preparation of O,O-dibutyl O-p-nitrophenyl thiophosphate, the step comprising maintaining reaction temperatures within the range of about −10° C. to +10° C. during the addition of a substantially equimolecular proportion of sodium alkylate to an alkyl alcoholic medium containing substantially equimolecular proportions each of p-nitrophenol and dibutoxythiophosphoryl chloride, said sodium alkylate containing at least 1 and not more than 8 carbon atoms and being added as a solution of sodium alkylate in alkyl alcohol.

7. The process of claim 6, wherein sodium alkylate is added as a solution of sodium butylate in butyl alcohol.

8. The process of claim 6, wherein sodium alkylate is added as a solution of sodium ethylate in ethyl alcohol.

9. In a process for the preparation of O,O-di-2-ethylhexyl O-p-nitrophenyl thiophosphate, the step comprising maintaining reaction temperatures within the range of about −10° C. to +10° C. during the addition of a substantially equimolecular proportion of sodium alkylate to an alkyl alcoholic medium containing substantially equimolecular proportions each of p-nitrophenol and di-2-ethylhexoxythiophosphoryl chloride, said sodium alkylate containing at least 1 and not more than 8 carbon atoms and being added as a solution of sodium alkylate in alkyl alcohol.

10. The process of claim 9, wherein sodium alkylate is added as a solution of the sodium 2-ethylhexylate in 2-ethylhexyl alcohol.

11. In a process for the preparation of O,O-dimethyl O-p-nitrophenyl thiophosphate, the step comprising maintaining reaction temperatures within the range of about −10° C. to +10° C. during the addition of a substantially equimolecular proportion of sodium alkylate to an alkyl alcoholic medium containing substantially equimolecular proportions each of p-nitrophenol and dimethoxythiophosphoryl chloride, said sodium alkylate containing at least 1 and not more than 8 carbon atoms and being added as a solution of sodium alkylate in alkyl alcohol.

12. The process of claim 11, wherein sodium alkylate is added as a solution of sodium methylate in methyl alcohol.

MICHAEL N. DVORNIKOFF.
EVAN J. YOUNG.

References Cited in the file of this patent

UNITED STATES PATENTS

| Number | Name | Date |
| --- | --- | --- |
| 2,471,464 | Toy | May 31, 1949 |
| 2,520,393 | Fletcher | Aug. 29, 1950 |
| 2,575,224 | Manske | Nov. 13, 1951 |

OTHER REFERENCES

Schrader, B. I. O. S. Report 1808, Oct. 4, 1948, pages 7–13.

Fletcher et al., J. Am. Chem. Soc., vol. 70, pages 3943–44 (1948).

Thurston, Field Information Agency Technical Final Report 949, Tech. Ind. Intelligence Div., U. S. Dept. of Commerce, Oct. 14, 1946, pages 19 and 120. (Received U. S. Patent Office Jan. 20, 1948; released May 30, 1947).